US006810158B2

(12) United States Patent
Hatase et al.

(10) Patent No.: US 6,810,158 B2
(45) Date of Patent: Oct. 26, 2004

(54) DEVICE AND METHOD FOR READING IMAGE, AND RECORDING MEDIUM FOR IMAGE READING PROGRAM

(75) Inventors: Takayuki Hatase, Fukuoka (JP); Masayuki Arase, Saga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 611 days.

(21) Appl. No.: 09/923,833

(22) Filed: Aug. 7, 2001

(65) Prior Publication Data

US 2002/0067863 A1 Jun. 6, 2002

(30) Foreign Application Priority Data

Aug. 7, 2000 (JP) ........................................ 2000-238932
Aug. 31, 2000 (JP) ........................................ 2000-263463

(51) Int. Cl.[7] ................................................. G06K 7/10
(52) U.S. Cl. ...................... 382/321; 382/270; 382/175
(58) Field of Search ................................. 382/321, 270, 382/175; 348/97, 295; 358/445, 446; 396/99

(56) References Cited

U.S. PATENT DOCUMENTS 4,384,272 A * 5/1983 Tanaka et al. ............... 382/175
4,763,154 A * 8/1988 Iguchi et al. .................. 396/99
6,005,617 A * 12/1999 Shimamoto et al. ........ 348/295

* cited by examiner

*Primary Examiner*—Anh Hong Do
(74) *Attorney, Agent, or Firm*—RatnerPrestia

(57) ABSTRACT

An image reading device reads an image of an electronic part as an image pickup object with camera 8 having a line sensor. The line sensor comprises a plurality of pixels having a photoelectric transfer element arranged in series. The image reading device selects pixels periodically one by one and outputs image signals. The pixels for outputting image signals are set based on width data of an image pickup area stored on image pickup area storage 10. The image reading device monitors a relative positional relation between the image pickup object and the line sensor using a pulse of encoder 4A, and controls writing of the image signal into an image storage 15 with a storage controller 12 based on length data of the image pickup area. This process can remove uselessness of outputting the image signal from an unnecessary range and storing it, and improve efficient image reading.

12 Claims, 14 Drawing Sheets

DEVICE AND METHOD FOR READING IMAGE, AND RECORDING MEDIUM FOR IMAGE READING PROGRAM

FIELD OF THE INVENTION

The present invention relates to an image reading device and an image reading method for reading an image to be picked up using a line sensor.

BACKGROUND OF THE INVENTION

An electronic-part mounting device uses a line sensor as an image pickup means for recognizing positions of electronic parts by image processing. The line sensor comprises pixels having a photoelectric transfer element for storing a charge corresponding to a received light amount and a transmission unit for receiving the charge from the pixels and outputting it as an electric signal. The pixels and the transmission unit are arranged in a line shape. When an optical system forms an optical image of a pickup object on the line sensor, each pixel stores a charge corresponding to the pickup object.

The transmission unit receives the charges from pixels and outputs them sequentially as electric signals to provide one-dimensional image data in the arrangement direction of the photoelectric transfer elements, namely in a main scan direction. A plurality of one-dimensional image data obtained by relatively moving an electronic part in a sub scan direction orthogonal to the main scan direction are arranged in parallel. A desired two-dimensional image data is thus provided. As the line sensor, a CCD line sensor is conventionally used.

There are many kinds of electronic parts having different size. A multifunctional electronic-part mounting device for such many kinds of electronic parts having different size must pick up images of the electronic parts with one image reading device. An image reading device using a line sensor generally often includes a line sensor with a scan width corresponding to a size of the largest electronic part, among electronic parts to be scanned.

The CCD line sensor used for the conventional image reading device must transmit charges from all pixels in the line sensor during the image reading independently of size of an object. Therefore, charges are also transmitted from an unnecessary range of pixels that do not include required information, and excessive time is required for reading an image.

SUMMARY OF THE INVENTION

The present invention provides image reading device and method that can drastically reduce an image reading time and improve image recognition efficiency, and a recording medium for an image reading program.

The image reading device in accordance with the present invention comprises a line sensor, a pixel selector, a relatively moving mechanism, an image pickup area storage, an image storage, an image output controller, and a storage controller. A plurality of pixels having a photoelectric transfer element are arranged in series in the X-direction in the line sensor. The pixel selector selects one of the pixels, and outputs an image signal through the selected pixel. The relatively moving mechanism moves the line sensor relatively to an image pickup object, at least in the Y-direction crossing the X-direction. The image pickup area storage stores X-directional numerical values and Y-directional numerical values for a size of an area picked up by the line sensor. The image storage stores the image signal supplied from the line sensor. The image output controller controls the pixel selection by the pixel selector based on the X-directional numerical values. The storage controller controls writing of the image signal into the image storage based on the Y-directional numerical values and positional information in the relatively moving mechanism.

DETAILED DESCRIPTION OF THE EXEMPLARY EMBODIMENTS

First Exemplary Embodiment

Figure 1:
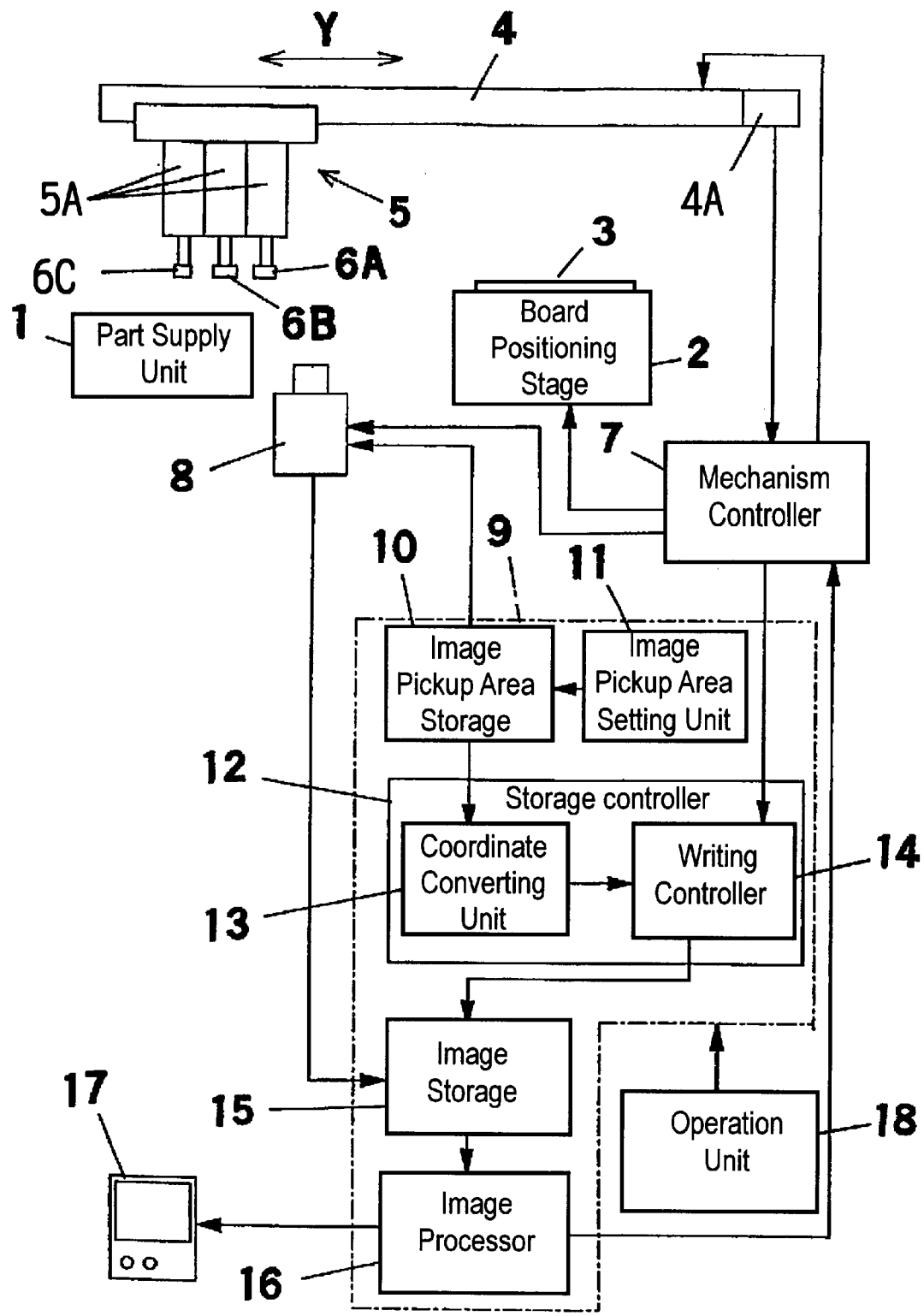
FIG. 1 is a block diagram of an electronic-part mounting device in accordance with a first exemplary embodiment of the present invention.
Figure 2:
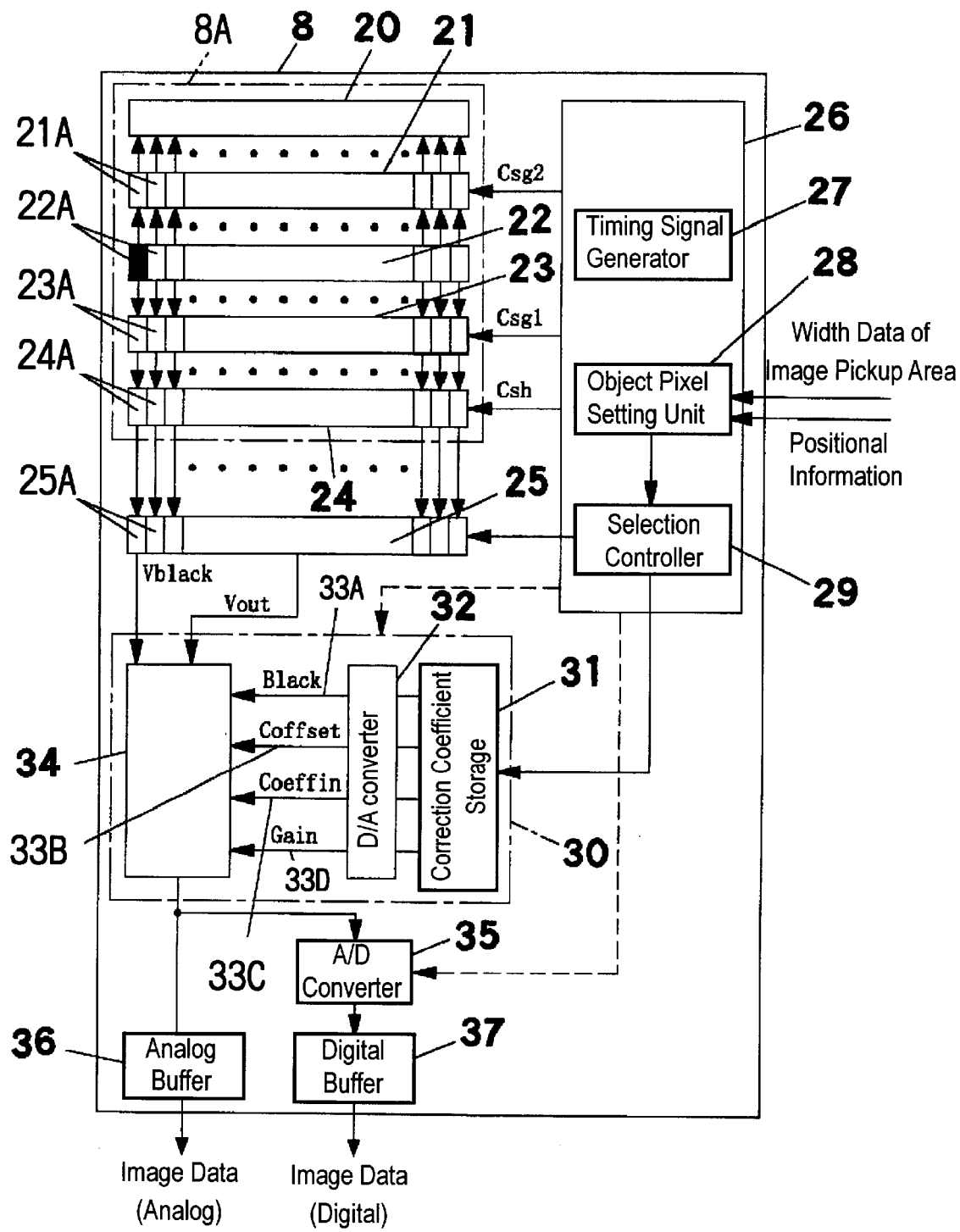
FIG. 2 is a block diagram of a camera of an image reading device in accordance with the first exemplary embodiment.
Figure 3:
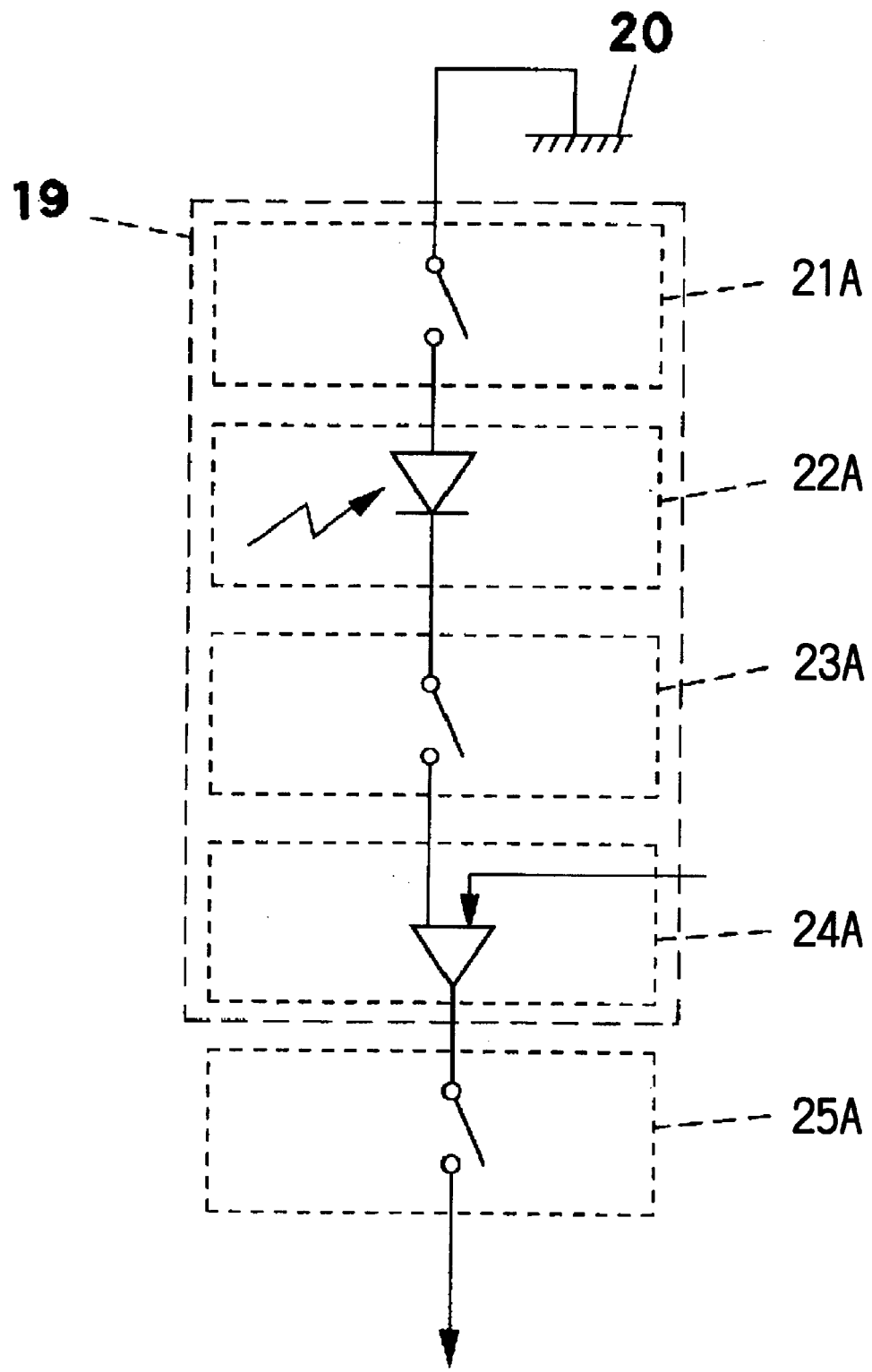
FIG. 3 is a block diagram of a line sensor of the image reading device in accordance with the first exemplary embodiment.
Figure 4:
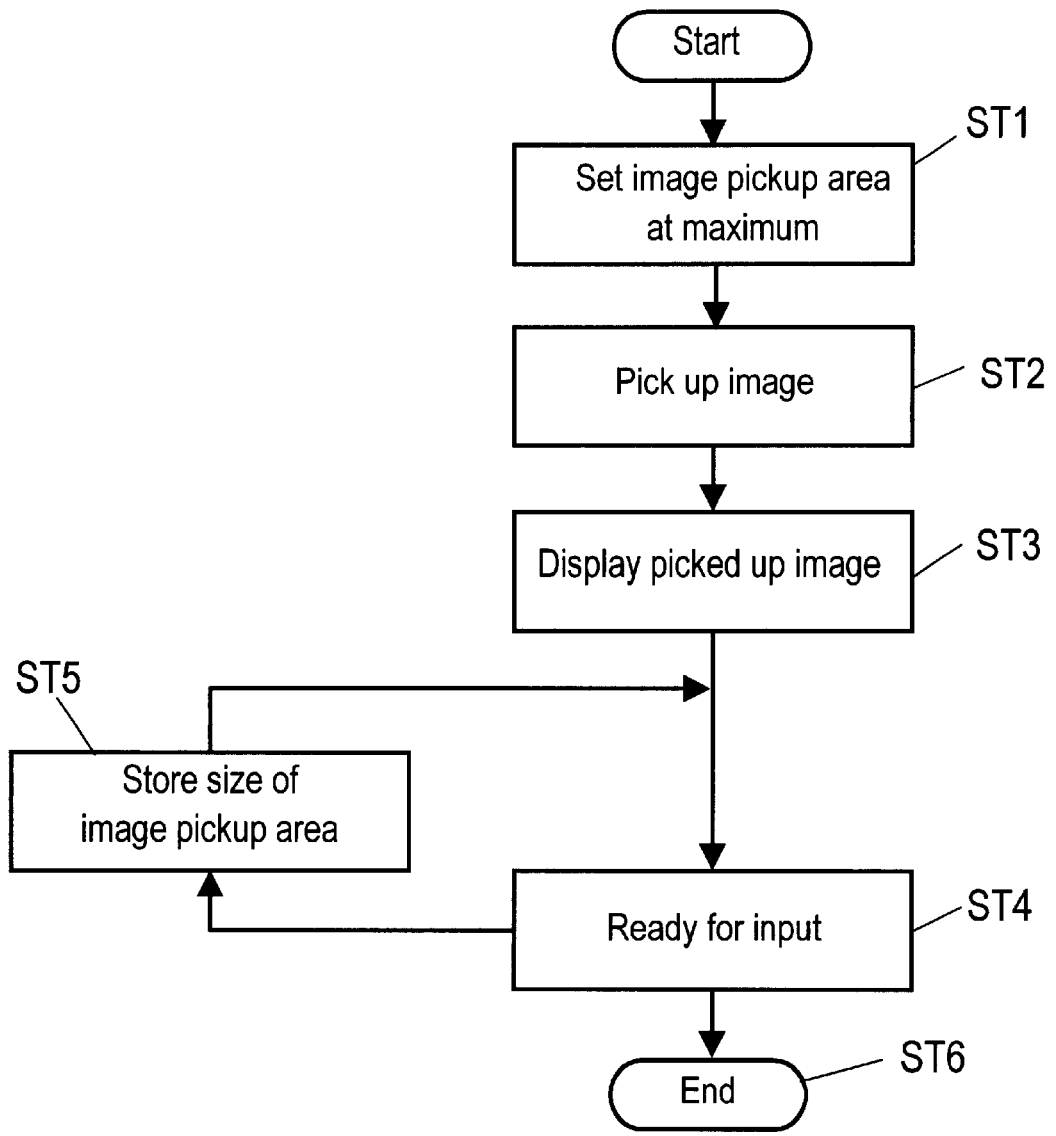
FIG. 4 is a flow chart of a setting process for an image pickup area of the image reading device in accordance with the first exemplary embodiment.
Figure 5A:
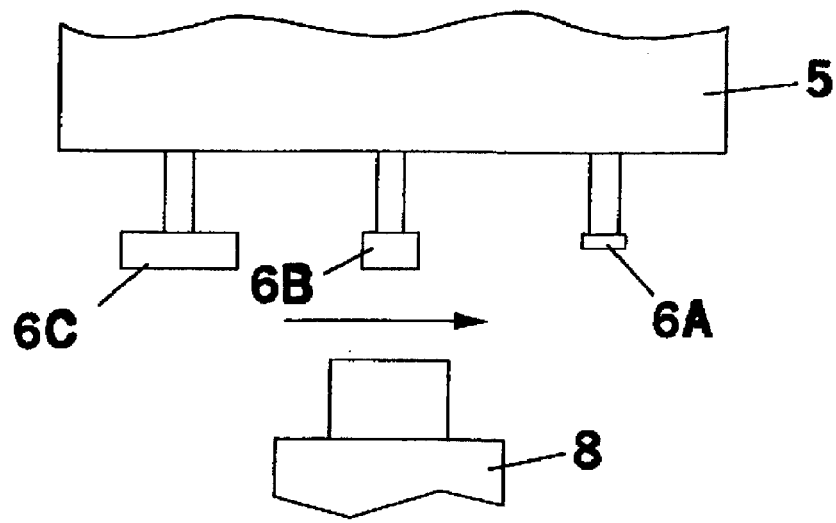
FIG. 5A, FIG. 5B, and FIG. 5C are illustrations of image pickup areas set by the image reading device in accordance with the first exemplary embodiment.
Figure 5B:
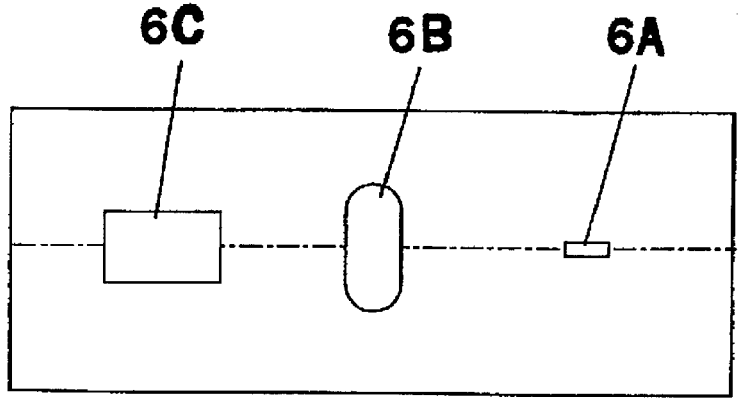
Figure 5C:
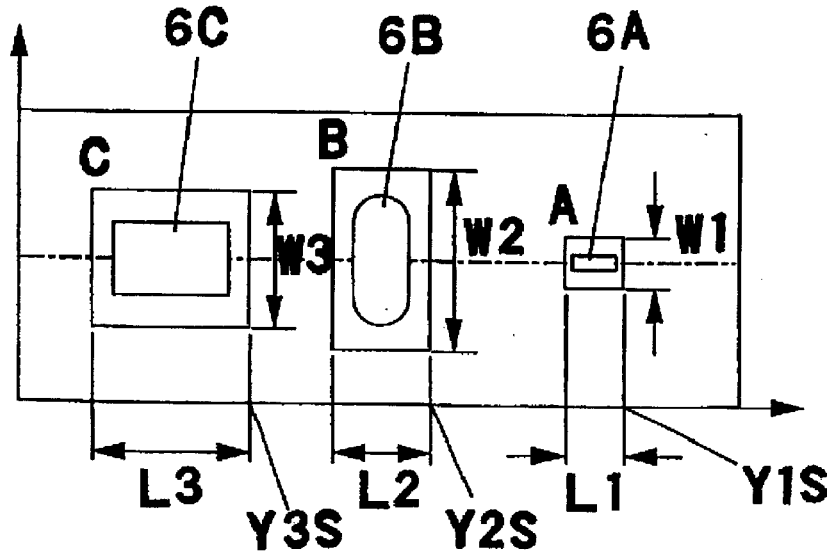
Figure 6:
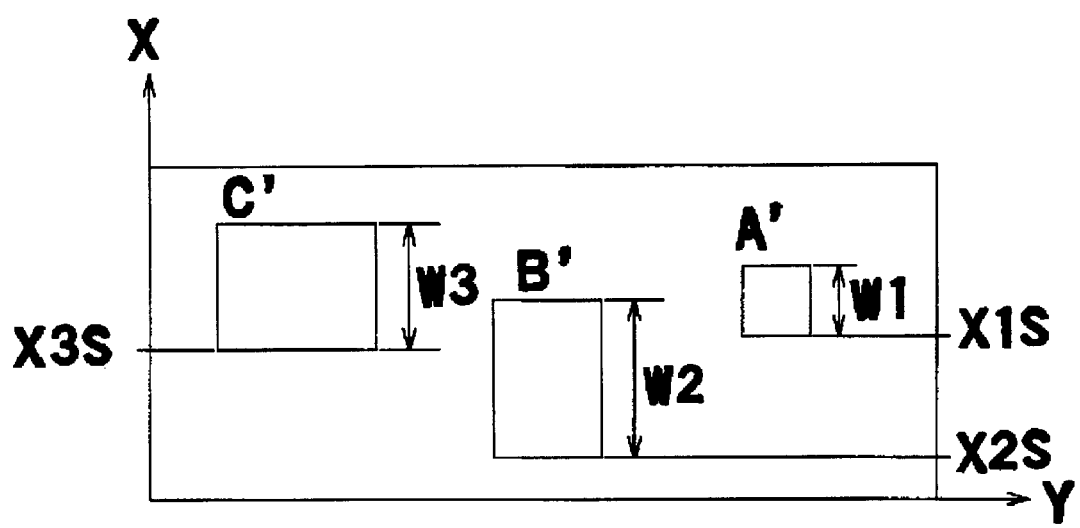
FIG. 6 is an illustration of image pickup areas set by the image reading device in accordance with the first exemplary embodiment.
Figure 7:
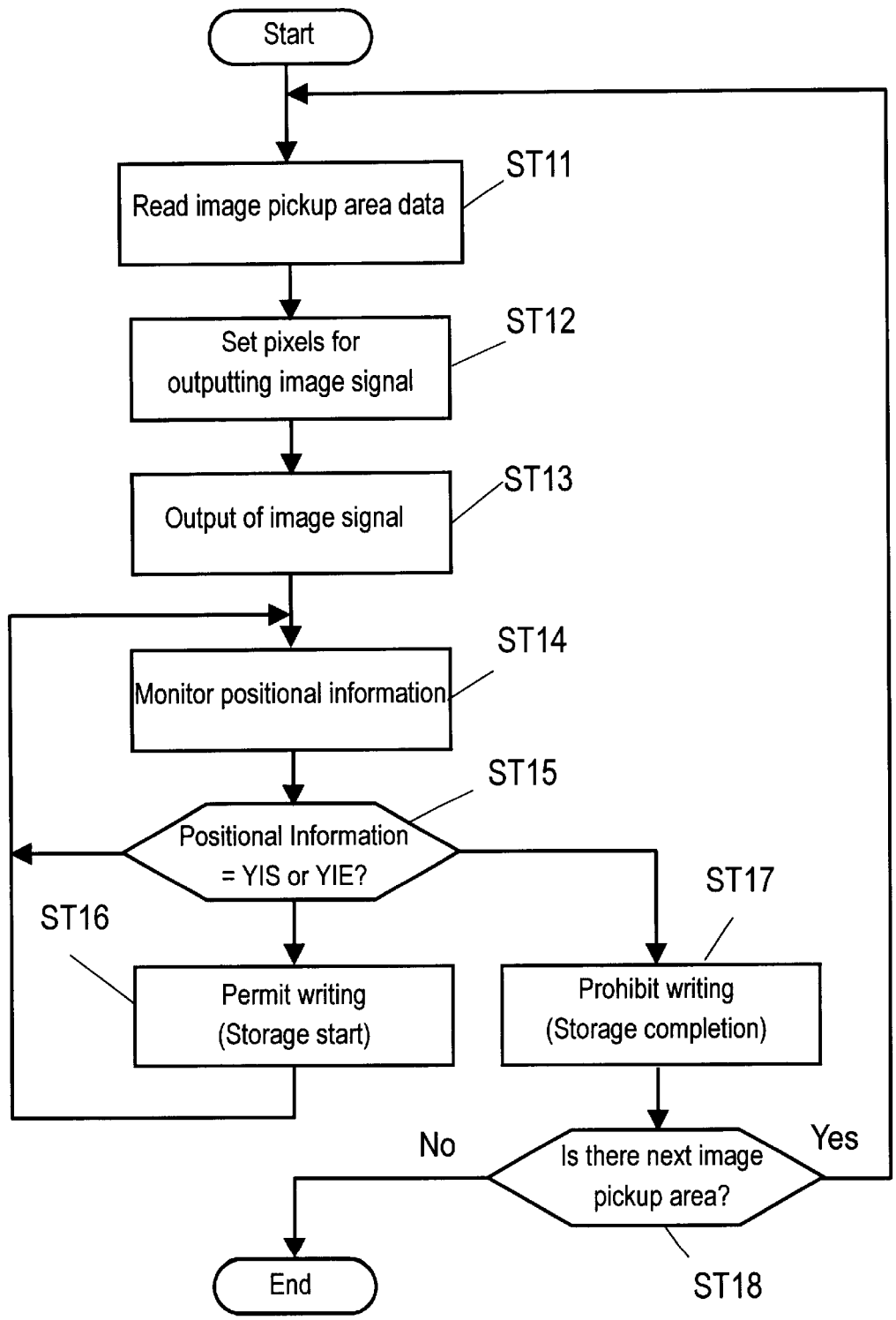
FIG. 7 is a flow chart of an image reading method in accordance with the first exemplary embodiment.
Figure 8:
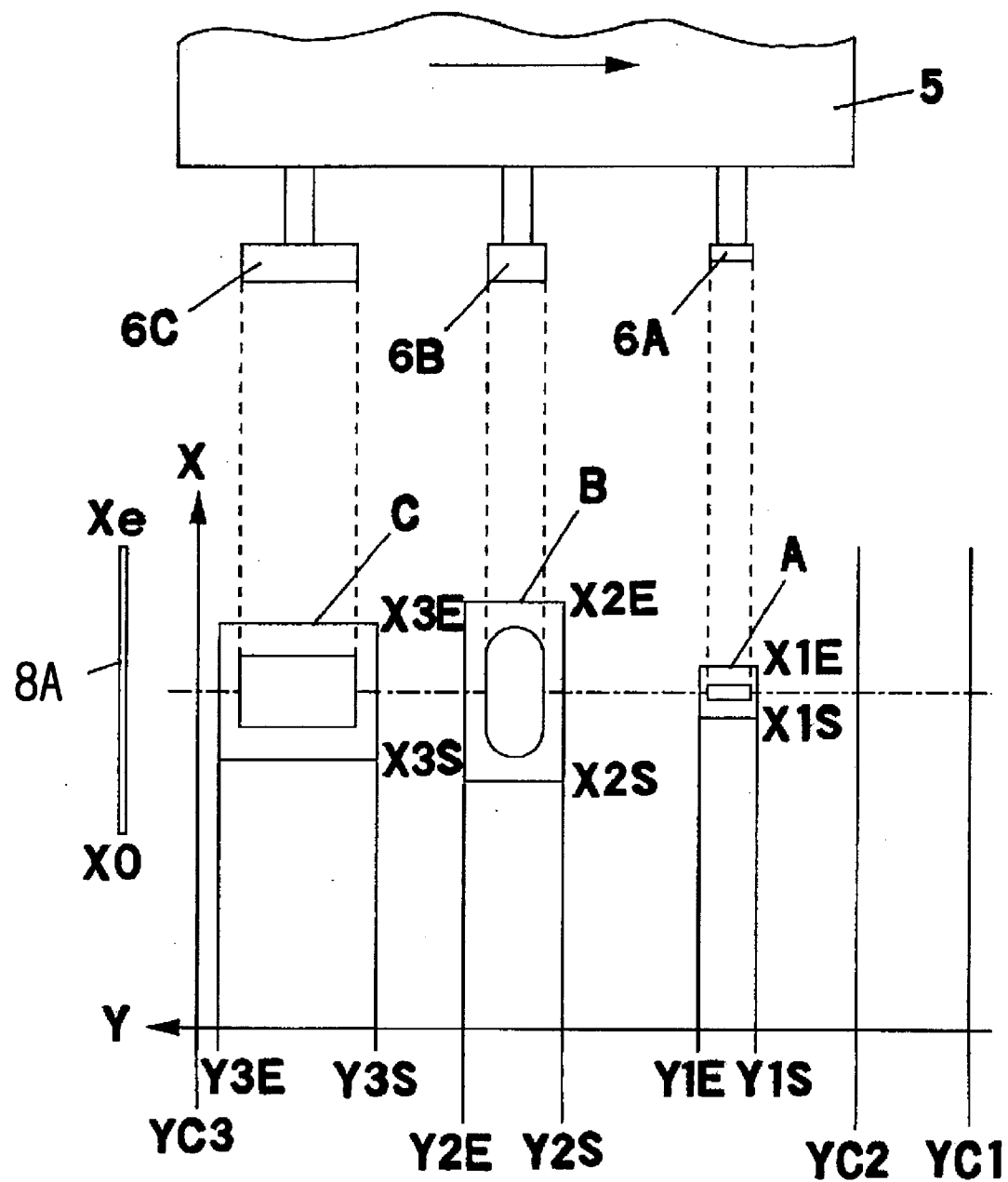
FIG. 8 is an illustration of the image reading method in accordance with the first exemplary embodiment.

A first exemplary embodiment of the present invention will be described hereinafter with reference to drawings. FIG. 1 is a block diagram of an electronic-part mounting device in accordance with the first exemplary embodiment. FIG. 2 is a block diagram of a camera of an image reading device in accordance with the first exemplary embodiment, FIG. 3 is a block diagram of a line sensor of the image reading device, and FIG. 4 is a flow chart of a setting process for image pickup areas of the image reading device. FIG. 5 and FIG. 6 are illustrations of image pickup areas set by the image reading device. FIG. 7 is a flow chart of an image reading method in accordance with the first exemplary embodiment, and FIG. 8 is an illustration of the image reading method.

Referring now to FIG. 1, an electronic-part mounting device including an image reading device is illustrated. In FIG. 1, part supply unit 1 supplies an electronic parts to be mounted. Board positioning stage 2 holds and positions board 3 receiving the electronic parts. Transfer head moving mechanism 4 holds transfer head 5 movable horizontally in the Y-direction above part supply unit 1 and stage 2. Moving mechanism 4 has encoder 4A for detecting an position, generates a pulse signal indicating an position of transfer head 5, and transmits it to mechanism controller 7.

Transfer head 5 is a multiple-string-type transfer head having three pickup heads 5A. The transfer head, under control by mechanism controller 7, extracts various electronic parts 6A, 6B, 6C from part supply unit 1 using respective pickup heads 5A, transfers them onto stage 2, and mounts them to board 3.

Camera 8 is disposed in a moving route of transfer head 5 between part supply unit 1 and stage 2. Camera 8, as described below, includes a line sensor in which a plurality of pixels having a photoelectric transfer element are arranged in series in the X-direction. Transfer head 5 holds electronic parts 6A, 6B, 6C above camera 8. Optical images of these electronic parts to be picked up are formed on the photoelectric transfer elements, and converted to electric image signals, which are supplied to recognition device 9 all the time.

Camera 8 picks up images of the electronic parts while moving mechanism 4 moves transfer head 5 in the Y-direction above camera 8. Two-dimensional images of the electronic parts to be recognized can be obtained. Moving mechanism 4 moves the line sensor of camera 8 in the Y-direction crossing to the arrangement direction (X-direction of the line sensor). In other words, moving mechanism 4 is a relatively moving mechanism for moving the line sensor relatively to the pickup objects.

Next, a configuration of recognition device 9 is described. Recognition device 9 processes the image signals supplied from camera 8 to recognize the electronic parts. As shown in FIG. 1, recognition device 9 comprises pickup area setting unit 11, pickup area storage 10, storage controller 12, image storage 15, and image processor 16. Storage controller 12 comprises coordinate converting unit 13 and writing controller 14.

Area setting unit 11 has a function of inputting X-directional numerical values and Y-directional numerical values for an image pickup area that are set when the recognition objects are picked up by the line sensor. These numerical values include size data for defining a width (X-directional size) and a length (Y-directional size) of the image pickup area, and numerical values for indicating an X-directional reference position of the image pickup area and a Y-directional reference positions (pickup start position) of the image pickup area.

As described below, these numerical values are input, on a display screen, as numerical values on an image coordinate system of an image processor for performing a display process of the screen. A set maximum width of the image pickup area may be any size as long as the size is smaller than a pixel arrangement width of the line sensor.

Area storage 10 stores the input numerical values for the image pickup area. Of the stored numerical values for the image pickup area, the X-directional numerical values are supplied to camera 8, and the Y-directional numerical values are supplied to coordinate converting unit 13 in controller 12.

Coordinate converting unit 13 converts the numerical values representing the Y-directional length of the image pickup area and the pickup start position from the image coordinate system to a machine coordinate system of moving mechanism 4. Coordinate converting unit 13 then transfers the converted values to writing controller 14. Writing controller 14 outputs a write permission signal of the image signals to image storage 15, based on the Y-directional numerical values converted by coordinate converting unit 13 and the positional information transferred from moving mechanism 4.

The write permission signal indicates a timing of permitting writing of the image signals into an image memory. The image signals are supplied from the line sensor of camera 8 all the time. The write permission signal is supplied to image storage 15 to control the writing of the image signals. Only image signals supplied from camera 8 with a predetermined timing are written into the image memory of image storage 15, and the writing of image signals supplied with the other timing is prohibited.

The writing controller monitors positional information of transfer head 5 transmitted from moving mechanism 4 through mechanism controller 7, compares the information with the Y-directional numerical values of the image pickup area stored on pickup area storage 10, and detects the pickup start position. In other words, based on the Y-directional numerical values of the image pickup area and the positional information from moving mechanism 4, controller 12 controls the pros and cons of writing image signals into image storage 15. Only the following image signals, of the image signals supplied from camera 8, are written into image storage 15 while transfer head 5 moves each of the electronic parts as a pickup object in the Y-direction. The image signals to be written are only the image signals output with a timing when a relative position of camera 8 to the pickup object corresponds to a predetermined image pickup area set for each electronic part.

Image processor 16 reads the written image signals, processes the image signals, and recognizes electronic parts 6A, 6B, 6C. The recognition result is fed to mechanism controller 7, and is used for controlling a mounting operation when these electronic parts are mounted to board 3. The control result is supplied to display unit 17 as required and displayed in a predetermined screen display manner. Operation unit 18 is used for various operations or inputs for recognition device 9.

Referring now to FIG. 2 and FIG. 3, a configuration of camera 8 used for the image pickup is illustrated. In FIG. 2, camera 8 comprises line sensor 8A, image output controller 26, and signal processor 30. Line sensor 8A, as shown below, comprises reset drain 20, second shift gate 21, photoelectric transfer unit 22, first shift gate 23, and sample hold unit 24.

Transfer unit 22 includes a plurality of photoelectric transfer elements 22A arranged in a lattice shape. First shift gate 23, transfer unit 22, and second shift gate 21 are placed in parallel. Each photoelectric transfer element 22A of transfer unit 22 is coupled to each gate element 23A of first shift gate 23 and each gate element 21A of second shift gate 21 as shown in FIG. 3. Each gate element 21A of second shift gate 21 is coupled to reset drain 20, each gate element 23A of first shift gate 23, and each condensed element 24A of sample hold unit 24.

Each condensed element 24A of sample hold unit 24 is coupled to each gate element 25A of pixel selector 25. Transfer element 22A, gate elements 21A, 23A, and condensed element 24A in a broken line frame shown in FIG.

3 form one of a plurality of pixels 19 arranged in series in line sensor 8A. Pixel selector 25 selects and outputs an image signal from each pixel 19 in line sensor 8A.

Image output controller 26 comprises timing signal generator 27, object pixel setting unit 28, and selection controller 29. Timing signal generator 27 generates an internal clock signal. Based on the timing signal, with a predetermined timing, the generator also generates control signal Csg1 and control signal Csg2 for respectively controlling opening/closing of first shift gate 23 and second shift gate 21, and control signal Csh for controlling a reset operation of sample hold unit 24.

When an optical image is formed on transfer unit 22, transfer element 22A is exposed to light and accumulates charge. When control signal Csg1 is transmitted to first shift gate 23, charges of respective transfer element 22A in transfer unit 22 are transmitted to respective condensed elements 24A in sample hold unit 24 at a time. The transmitted charges are held as voltage values corresponding to charge amounts. When control signal Csh is transmitted to sample hold unit 24 before transmission of new charges, the held voltage values are reset. When control signal Csg2 is transmitted to second shift gate 21, the charge of each transfer element 22A in transfer unit 22 is discharged to reset drain 20. The voltage of each transfer element 22A is thus initialized.

Pixel selector 25 selects one of the plurality of pixels in line sensor 8A and outputs an image signal from the selected pixel. In other words, pixel selector 25 supplies a voltage value as image signal Vout from an element specified by controller 29, among condensed elements in sample hold unit 24. Output controller 26 controls this pixel selecting operation.

One of transfer elements 22A in transfer unit 22 (black transfer element 22A at the most left end) is a reference element for setting a black reference level on an image. Reference voltage Vblack corresponding to the black reference level is output based on a charge transmitted from the reference element.

Setting unit 28 specifies pixels for outputting image signals, based on width data (X-directional numerical values) of an image pickup area read from area storage 10. In other words, setting unit 28 converts a numerical value (numerical value on the image coordinate system) for the width of the image pickup area to number of pixels in line sensor 8A, and thus obtains data for specifying the pixels for outputting the image signals during the image pickup by line sensor 8A. The data is fed to controller 29.

Controller 29 selects pixels for outputting the image signals periodically one by one, based on the data for specifying the pixels. Controller 29 controls pixel selector 25 to sequentially output the image signals from the specified pixels at a predetermined time interval. Controller 29 of output controller 26 controls the selection of the pixels for outputting the image signals by pixel selector 25 using X-directional numerical values of the image pickup area. Only pixels corresponding to the image pickup area, among pixels in line sensor 8A, sequentially output the image signals.

The width data of the image pickup area received by setting unit 28 is represented based on the number of pixels in line sensor 8A, as described below. When a position of a pixel as a reference of an image pickup position and number of pixels for specifying the width of the image pickup area are provided as they are, a function of setting unit 28 is not required and the data is transmitted to controller 29 without being processed.

The image signal supplied from each pixel in line sensor 8A through pixel selector 25 is fed to signal processor 30. Signal processor 30 comprises correction coefficient storage 31, D/A converter 32, and image signal correction unit 34. Correction unit 34 corrects the image signals. In this correction process, D/A converter 32 converts digital correction data stored on storage 31 to an analog signal, and correction unit 34 adds the analog signal to the image signals from pixel selector 25. Four correction coefficients Black33A, Coffset33B, Coeffin33C, Gain33D are used.

Correction coefficients Black33A, Coffset33B are used for setting a reference voltage as the black reference level of the image. Coefficient coefficients Black33A, Coffset33B are respectively used for correcting a black level of the entire image and a black level every pixel forming the image. Correction coefficients Coeffin33C, Gain33D are respectively used for setting sensitivity of the entire image and sensitivity every pixel. Signal processor 30 performs a process based on a timing signal supplied from output controller 26.

Analog image signals after the correction are fed to A/D converter 35. A/D converter 35 converts the analog image signals to digital image signals based on the timing signal supplied from output controller 26. Digital image data after the A/D conversion is output through digital buffer 37. The analog image signals are output as display image data as required through analog buffer 36 without being processed.

Next, a setting process of the image pickup area is described. Line sensor 8A in accordance with the present embodiment, differently from the conventional CCD line sensor, can supply image signals from any specified pixels, among a plurality of pixels 19 in line sensor 8A. In the image pickup by line sensor 8A, therefore, pixels for outputting image signals must be specified responsive to an image pickup object.

Line sensor 8A outputs image signals all the time. For obtaining a two-dimensional image of the image pickup object, only image signals supplied with a timing corresponding to the set image pickup area, among the image signals output all the time during scanning, is written into an image memory. Accordingly, in the setting process of the image pickup area, pixels for outputting image signals in line sensor 8A is specified, and data for setting timing of writing the image signals is input. Referring now to FIG. 4 and FIG. 5, the setting process of the image pickup area is illustrated in accordance with the flow in FIG. 4.

An image pickup area is first set at the maximum in the flow in FIG. 4 (ST1). A width of the image pickup area read into setting unit 28 is set at the maximum. When controller 29 controls pixel selector 25, all pixels 19 arranged in line sensor 8A output image signals. Write controller 14 supplies a write permission signal to image storage 15 so as to continuously write the output image signals.

Under this set condition, images of electronic parts to be recognized are picked up (ST2). While transfer head 5 holding electronic parts 6A, 6B, 6C moves horizontally at a predetermined scan speed, camera 8 picks up images of each of the held electronic parts, and image signals are continuously written into image storage 15, as shown in FIG. 5(A). Image processor 16 reads the image data, and displays it on the screen of display unit 17 (ST3). Images of electronic parts 6A, 6B, 6C that respectively are held by three nozzles of transfer head 5 are displayed on one screen at an interval corresponding to a nozzle pitch, as shown in FIG. 5(B).

This state is ready for data input for setting an image pickup area (ST4). When a predetermined data is input, the image pickup area is set on the screen. Image information other than a region including the electronic parts to be recognized is not required for recognizing the electronic parts. Regions A, B, C including the respective electronic parts 6A, 6B, 6C are set as image pickup areas as shown in FIG. 5(C). In this setting operation, operation unit 18 specifies and inputs region frames with a pointer or the like on the display screen of display unit 17.

Accordingly, area setting unit 11 sets numerical values (W1, L1), (W2, L2), (W3, L3) representing sizes (width, length) of respective image pickup areas A, B, C, and numerical values Y1S, Y2S, Y3S representing image pickup start positions of respective image pickup areas A, B, C. These numerical values belong on an image coordinate system of image processor 16.

Width data (X-directional numerical values) of the image pickup areas generally require reference position data as well as W1, W2, and W3. It must be determined which pixel serves as a reference position in the pixel arrangement in line sensor 8A during setting of each image pickup area. However, image pickup areas A, B, C are often set so that the centers thereof match with the centerline of an image pickup view field, as shown FIG. 5(C). In this case, input of the reference positions is not required, and only W1, W2, and W3 representing widths of the image pickup areas are input. When image pickup areas A', B', C' are set away from the centerline of the image pickup view field as shown in FIG. 6, not only numerical values W1, W2, W3 but also numerical values X1S, X2S, X3S representing X-directional reference positions of the image pickup areas are input.

The numerical values fed for setting the image pickup areas are stored on area storage 10 (ST5). The setting operation finishes by recognizing the input for the setting, and the setting process of the image pickup areas finishes (ST6).

The illustration described above shows an example that the numerical values of the image pickup areas on the image coordinate system of image processor 16 are stored on area storage 10 without any process. However, the numerical data may also be stored on area storage 10 in the following data format; X-directional numerical values are based on the number of pixels in line sensor 8A, and Y-directional numerical values belong to the mechanical coordinate system.

In the latter case, the X-directional numerical values of the image pickup areas on the image coordinate system are converted to numerical values representing the number of pixels in the pixel arrangement in line sensor 8A and pixel positions, and then stored. The X-directional numerical values are W1, W2, and W3 representing the widths and X1S, X2S, and X3S representing the reference positions. The Y-directional numerical values are converted from the image coordinate system to the mechanical coordinate system of moving mechanism 4, and then stored. The Y-directional numerical values are L1, L2, and L3 representing the lengths of respective image pickup areas and Y1S, Y2S, and Y3S representing the pickup start positions thereof.

The X-directional numerical values in this format include the number of pixels corresponding to the X-directional sizes of the image pickup areas. The Y-directional numerical values belong to the mechanical coordinate system of moving mechanism 4, and positional information (Y1S, Y2S, Y3S) of the image pickup areas are positions on the mechanical coordinate system. When this data storing format is used, the process by setting unit 28 is not required, and data conversion by coordinate converting unit 13 is not required each time an image data is extracted.

Referring now to FIG. 7 and FIG. 8, an image reading process is illustrated. The image pickup areas are set responsive to the recognition objects as described above, prior to the image reading process. FIG. 8 shows a relative positional relation of actual electronic parts 6A, 6B, 6C to the X-directional and Y-directional numerical values set for the image pickup areas A, B, C for electronic parts 6A, 6B, 6C. Numerical values X1S, X2S, X3S are based on the number of pixels in the pixel arrangement in line sensor 8A, and numerical values Y1S, Y2S, Y3S belong to the mechanical coordinate system of moving mechanism 4 for moving transfer head 5 (for example, number of pulses supplied from encoder 4A).

(X1E–X1S), (X2E–X2S), and (X3E–X3S) respectively correspond to W1, W2, and W3 shown in FIG. 5(C). (Y1E–Y1S), (Y2E–Y2S), and (Y3E–Y3S) respectively correspond to L1, L2, and L3. YC1, YC2, and YC3 set on the Y-axis are speed change positions corresponding to timings of changing relative moving speed of transfer head 5 to line sensor 8A.

Each of Y-directional numerical values (YC1, YC2, Y1S, Y1E, . . . , Y3E, YC3) on the Y-axis shown in FIG. 8 corresponds to a specific relative positional relation in the Y-direction between line sensor 8A and transfer head 5. These numerical values indicate positional relation of line sensor 8A to transfer head 5 moving horizontally. When positional information (pulse signal) from encoder 4A in moving mechanism 4 matches to value YC1, for example, it is shown that transfer head 5 reaches a deceleration position set for realizing a stable scan speed. Value YC2 corresponds to a speed setting position at which the deceleration is completed to provide a constant scan speed.

Numerical values Y1S, Y1E correspond to a pickup start position and a pickup completion position of image pickup area A set for electronic part 6A held by transfer head 5. Respective numerical values Y1S, Y1E show that the pickup start position and the pickup completion position reach a part just over line sensor 8A. Numerical values Y2S, Y2E, Y3S, Y3E similarly correspond to pickup start positions and pickup completion positions of image pickup areas B, C, respectively.

Positional information from encoder 4A is monitored. When the positional information matches to each of the numerical values, specific relative positional relation corresponding to the value is realized. Based on the monitoring result, various operation controls such as operation control of transfer head 5, writing control of image signals, and update of set pixels for outputting the image signals in line sensor 8A are performed.

The image reading process will be hereinafter described in accordance with the flow shown in FIG. 7. When image reading of a pickup object is started, preset data of image pickup areas A, B, C, namely numerical values shown in FIG. 8, is first read from area storage 10 (ST11). Based on the read data, setting unit 28 sets pixels for outputting image signals when image in image pickup area A to be first picked up is extracted (ST12). Pixels between X1S and X1E shown in FIG. 8, among pixels in line sensor 8A of camera 8, are thus set as the pixels for the output.

The set pixels supplies image signals all the time (ST13). The reading operation is started, and transfer head 5 holding electronic parts as image pickup objects starts moving. A pulse supplied from encoder 4A in moving mechanism 4 is fed as positional information to writing controller 14 and output controller 26 of camera 8 through mechanism controller 7. Writing controller 14 monitors this positional information (ST14).

When the positional information matches to deceleration position YC1, transfer head 5 starts deceleration, and obtains a stable scan speed at YC2. When the positional information matches to Y1S corresponding to the pickup start position of image pickup area A (ST15), writing controller 14 supplies a write permission signal to image storage 15 (ST16). Storage of image signals supplied from the pixels between X1S and X1E is started. When the positional information then matches to Y1E corresponding to the pickup completion position of image pickup area A (ST15), writing controller 14 stops the output of the write permission signal to image storage 15 and prohibits writing (ST17). This now finishes image storage for image pickup area A onto image storage 15.

Next, whether a next image pickup area exists or not is determined (ST18). When the existence is determined, images of a next image pickup area are picked up similarly. Output controller 26 identifies the image pickup area based on positional information from mechanism controller 7, and performs an update process of pixels for outputting image signals set by setting unit 28 responsive to width size of the image pickup area. Image reading for all image pickup areas is thus completed. Transfer head 5, after reaching speed return position YC3, moves toward stage 2 at a high speed.

In the image reading method in accordance with the present embodiment, as described above, line sensor 8A in which a plurality of pixels are arranged in series in the X-direction reads an image pickup object while the sensor moves relatively to the object, in the Y-direction. This image reading method comprises the following steps of:

(1) setting an image pickup area;
(2) setting a plurality of pixels for outputting image signals, among pixels in line sensor 8A, based on X-directional width of the set image pickup area;
(3) setting pixels periodically one by one for image pickup and outputting the image signals from the pixels; and
(4) monitoring positional information on a relative positional relation in the Y-direction between the image pickup object and line sensor 8A to control writing of the image signals into image storage 15.

At this time, the image signals are supplied only from the plurality of pixels set in step (2).

In this image reading process, the image signals are selectively supplied only from an image pickup range corresponding to an image pickup region to be read when line sensor 8A outputs the image signals. This image reading process can therefore remove useless time of outputting image signals from an unnecessary range and reduce an image reading time. Transfer head 5 moves onto stage 2 after recognition of electronic parts 6A, 6B, 6C. When transfer head 5 moves onto stage 2 and each electronic part is mounted onto board 3, a displacement of each electronic part detected based on the recognition result is corrected. Since the mounting operation drastically reduces the image reading time, high speed image recognition can be realized, and mounting efficiency can be improved.

In the image reading method in accordance with the first embodiment of the present invention, when a line sensor outputs the image signals, image signals are selectively supplied only from photoelectric transfer elements corresponding to an image pickup area set for outputting the image signals in an image pickup range. Additionally, a relative positional relation between the image pickup object and the line sensor is monitored to control writing of the image signals. Therefore, this image reading method can remove uselessness of outputting image signals from an unnecessary range and improve image reading efficiency.

Second Exemplary Embodiment

Figure 9:
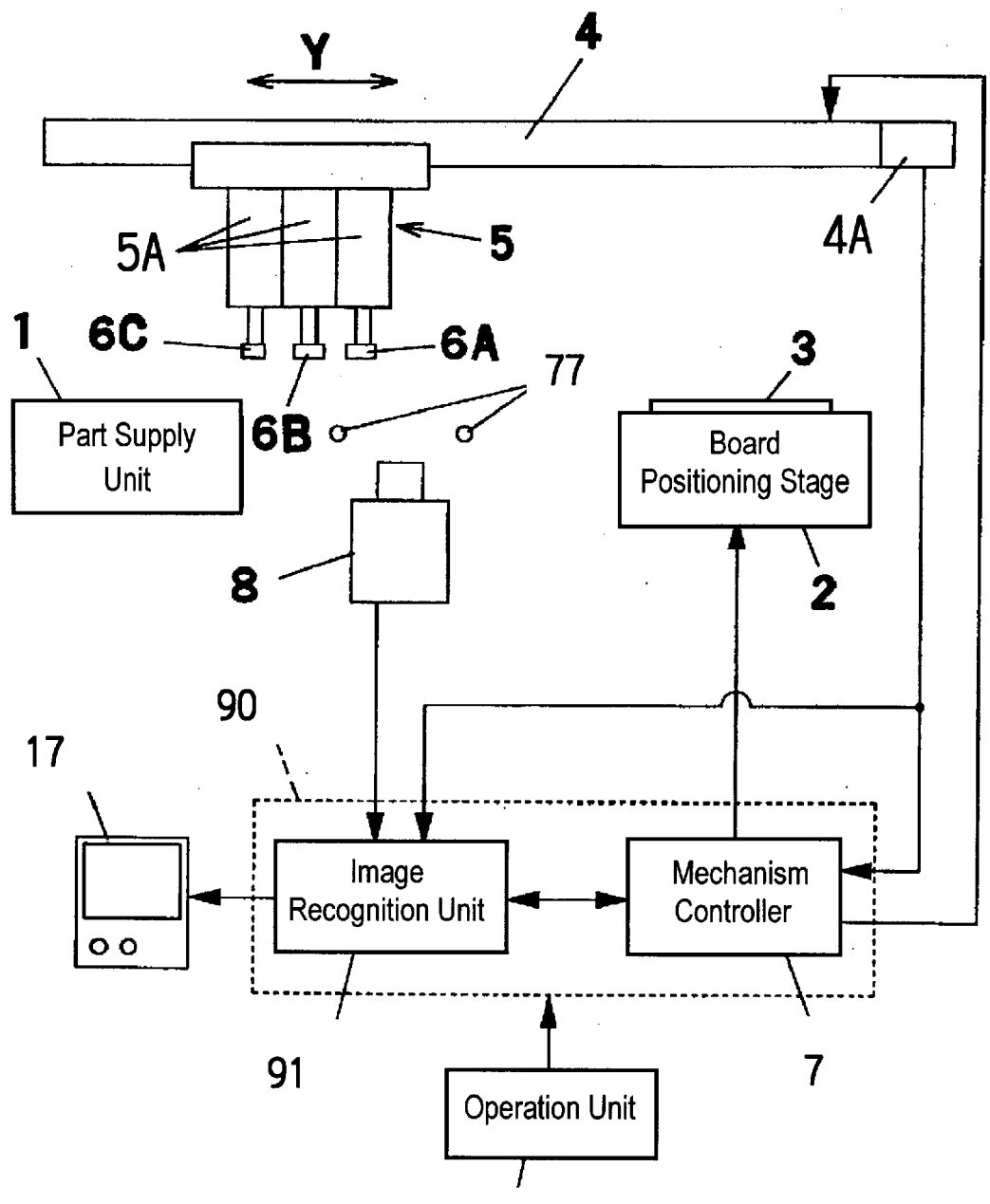
FIG. 9 is a block diagram of an electronic-part mounting device in accordance with a second exemplary embodiment of the present invention.
Figure 10:
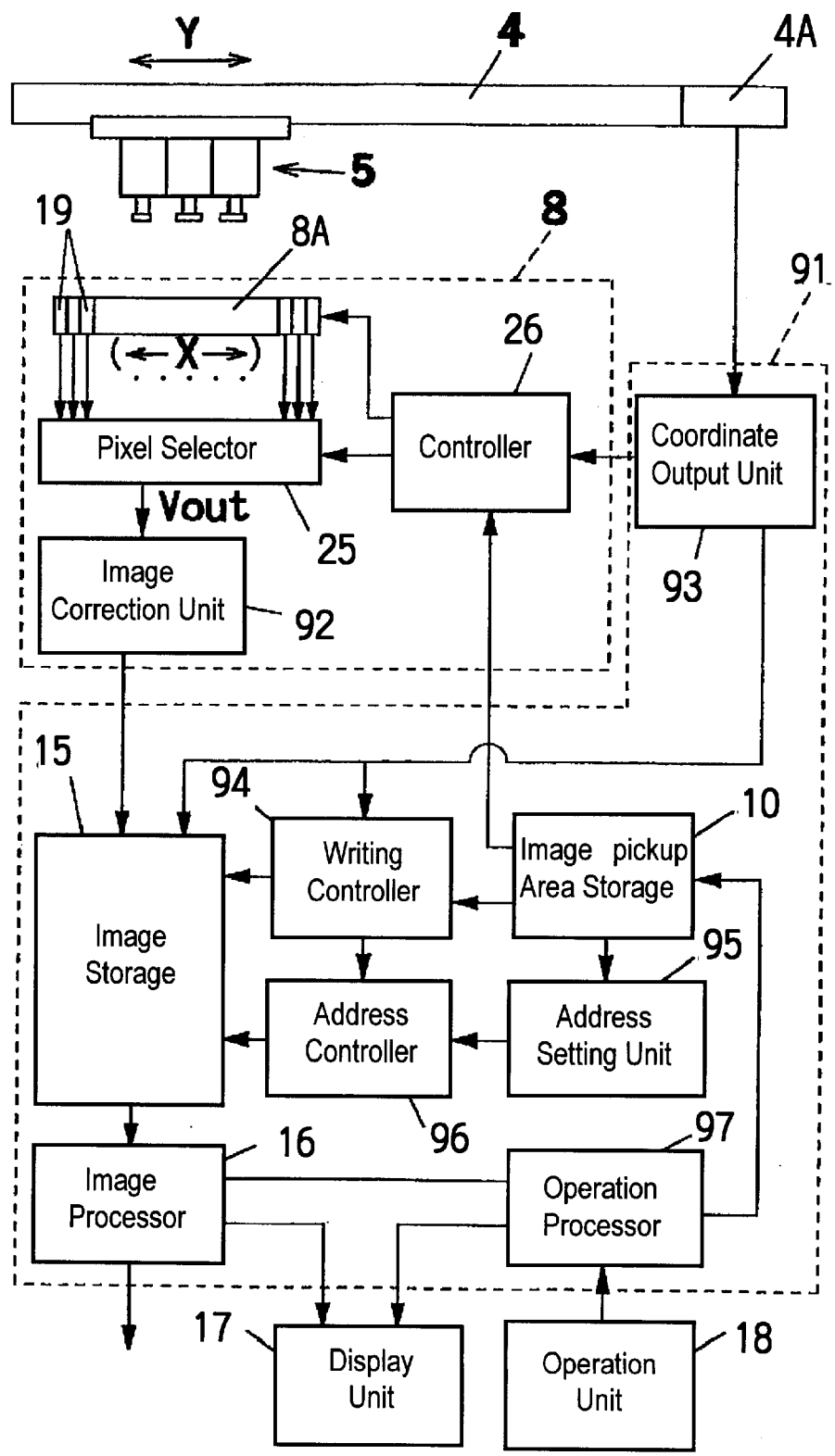
FIG. 10 is a block diagram of an image pickup device in accordance with the second exemplary embodiment.
Figure 11:
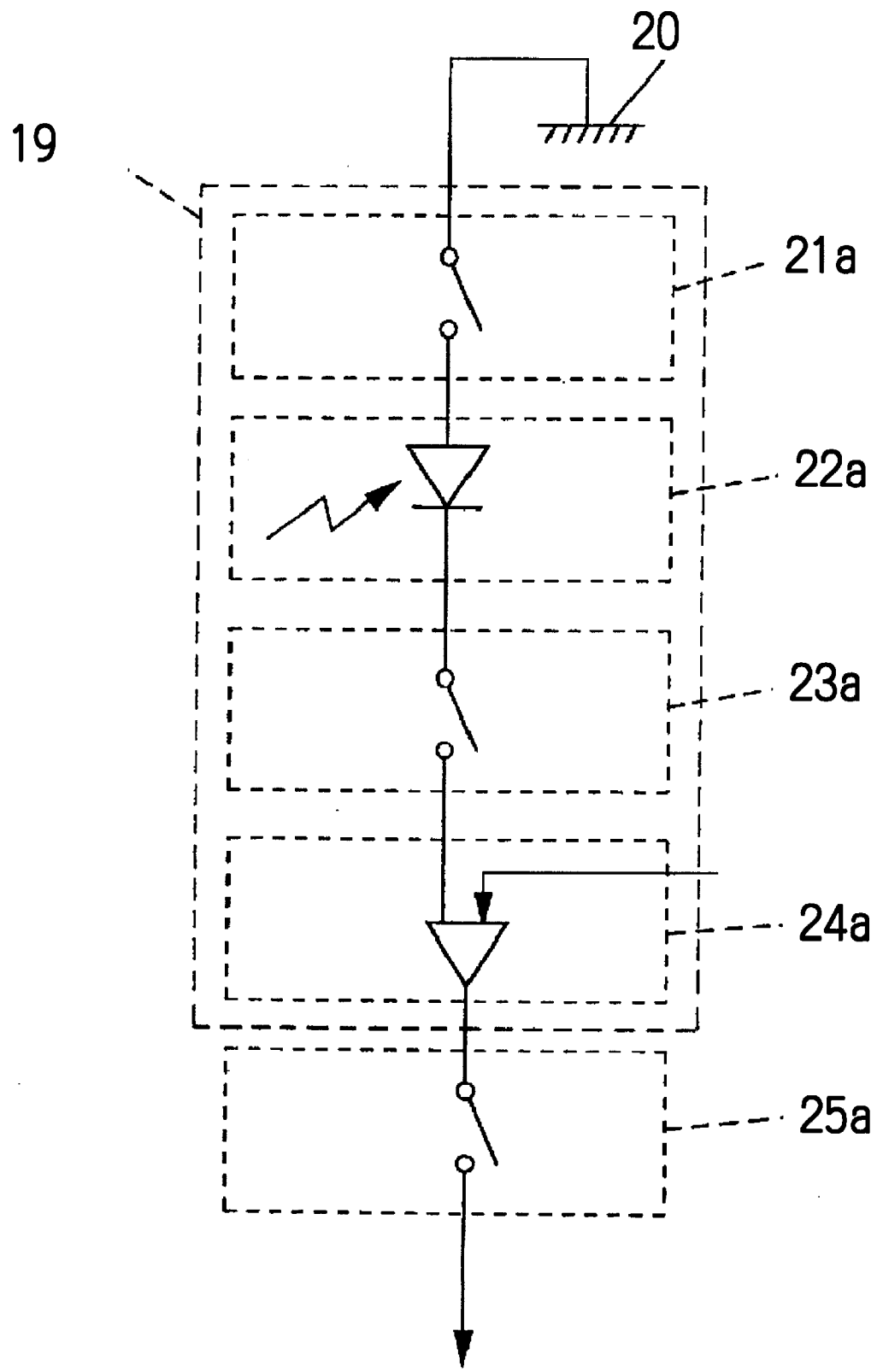
FIG. 11 is a block diagram of a line sensor of the image pickup device in accordance with the second exemplary embodiment.
Figure 12:
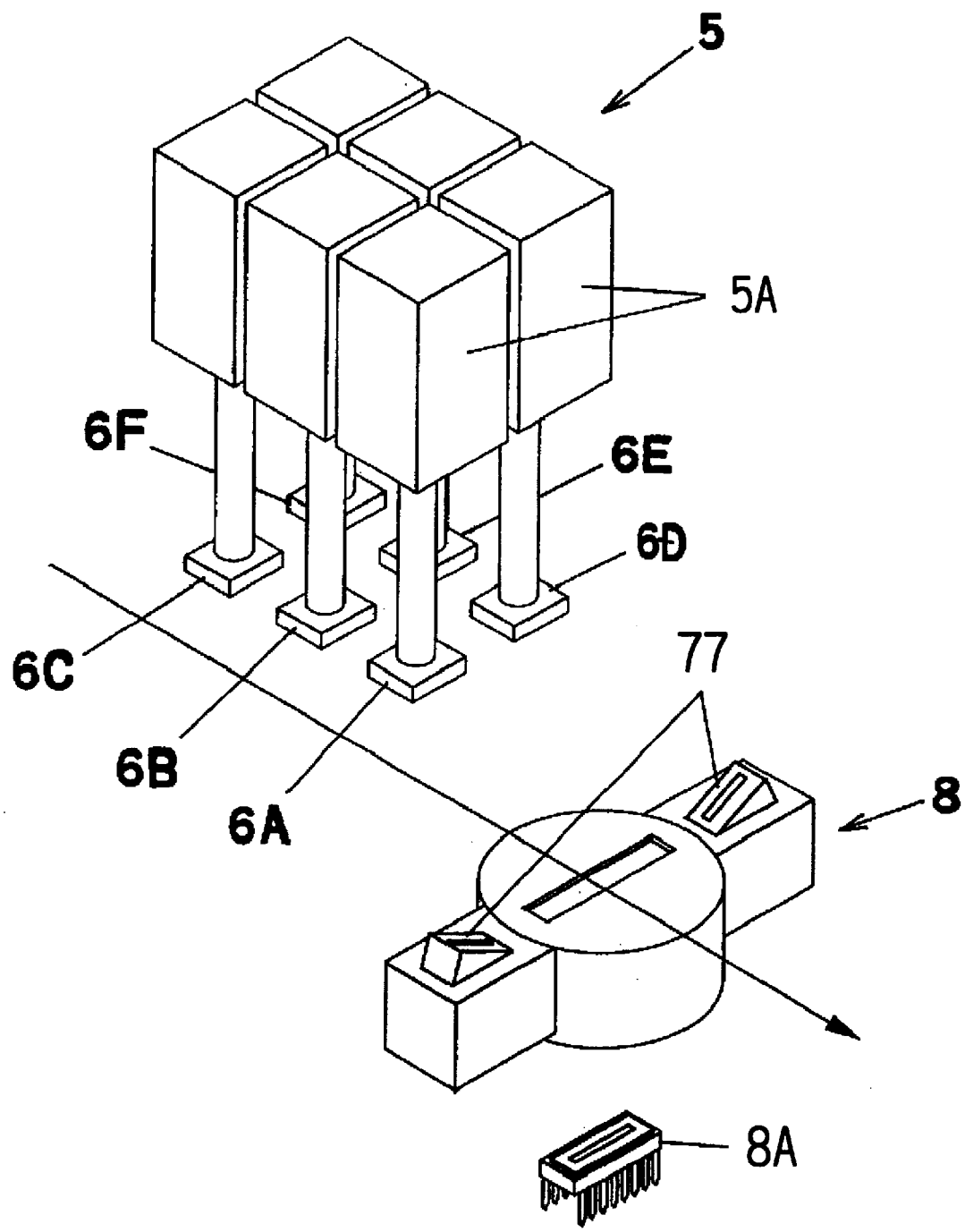
FIG. 12 is an illustration of an image pickup method of the image pickup device in accordance with the second exemplary embodiment.
Figure 13A:
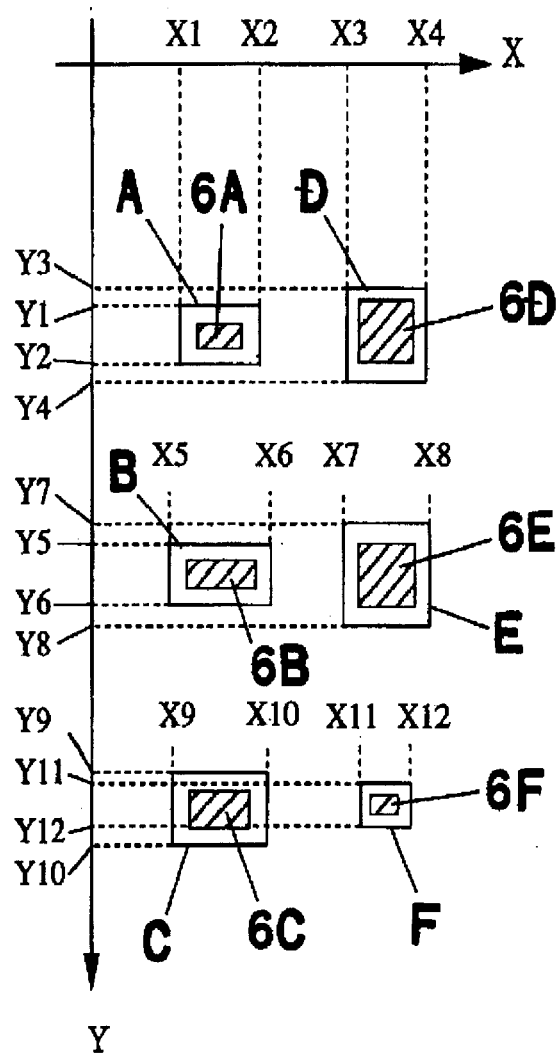
FIG. 13A and FIG. 13B are illustrations of image pickup areas set by the image pickup device in accordance with the second exemplary embodiment.
Figure 13B:
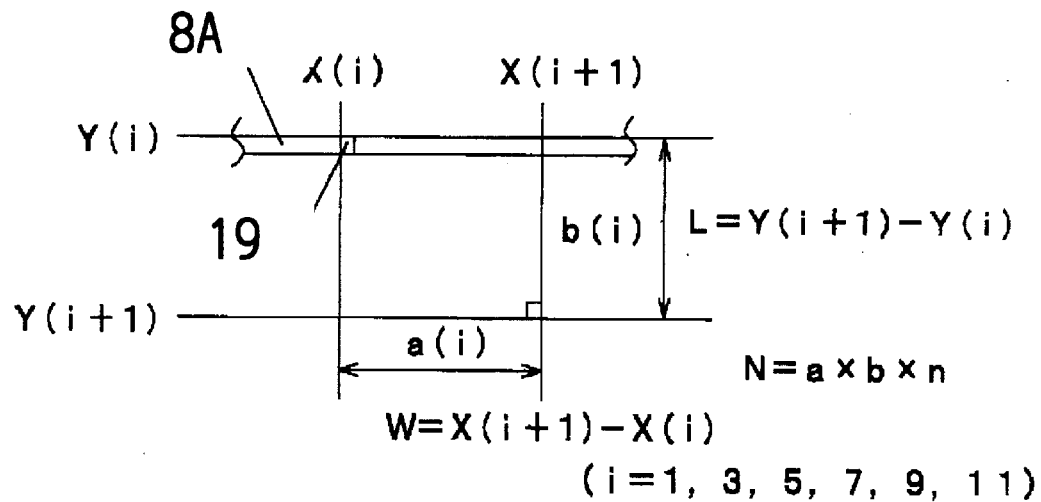
Figure 14:
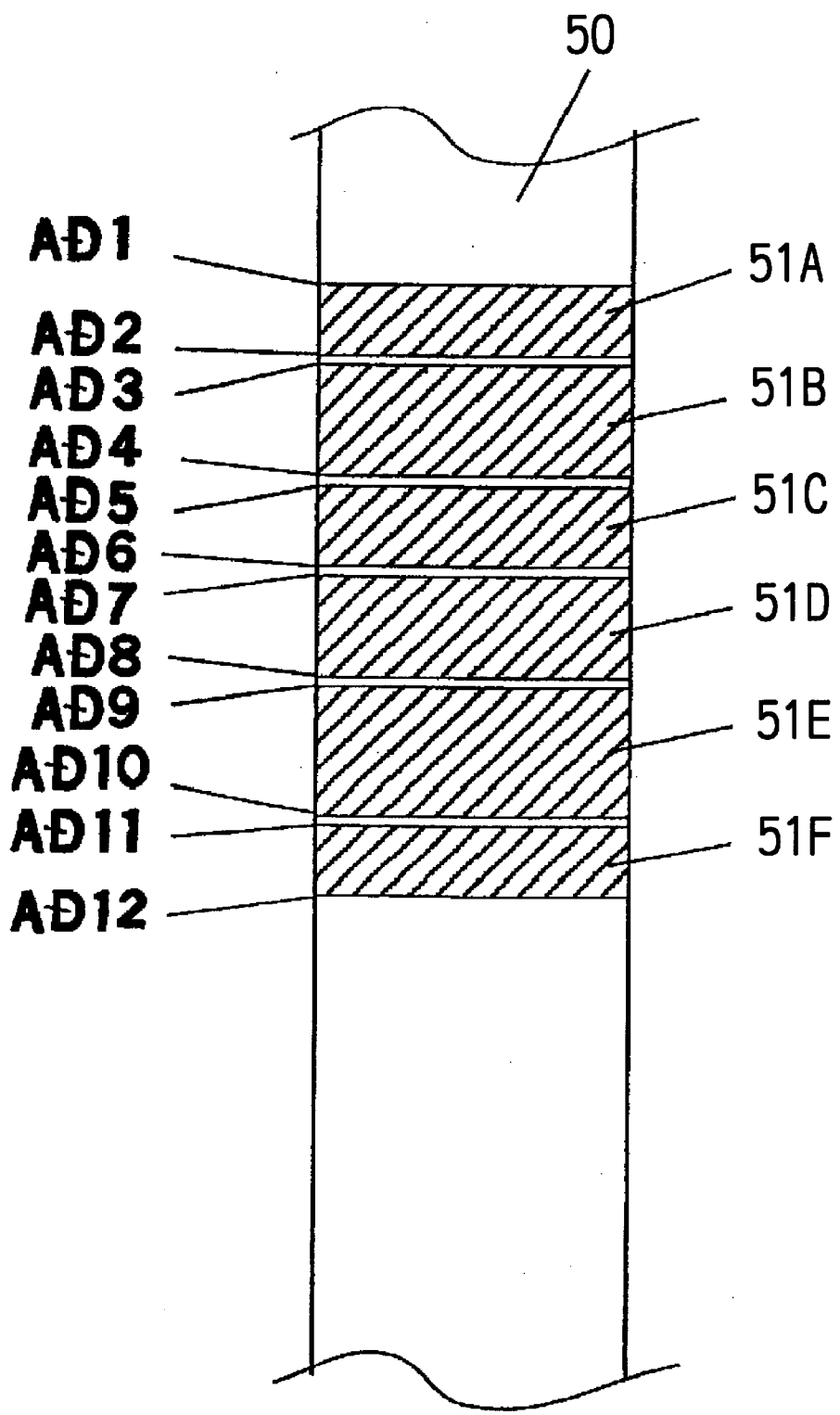
FIG. 14 is an illustration of set storage addresses of image data in the image pickup method in accordance with the second exemplary embodiment.

A second exemplary embodiment of the present invention will be described hereinafter with reference to drawings. FIG. 9 is a block diagram of an electronic-part mounting device in accordance with a second exemplary embodiment of the present invention. FIG. 10 is a block diagram of an image pickup device in accordance with the second exemplary embodiment. FIG. 11 is a block diagram of a line sensor of the image pickup device, FIG. 12 is an illustration of an image pickup method of the image pickup device, and FIG. 13A and 13B are illustrations of set image pickup areas of the image pickup device. FIG. 14 is an illustration of storage address of image data in the image pickup method in accordance with the second exemplary embodiment.

Referring now to FIG. 9, an electronic-part mounting device including an image pickup device is illustrated. In FIG. 9, part supply unit 1 supplies electronic parts to be mounted. Board positioning stage 2 holds and positions board 3 to which the electronic parts are mounted. Transfer head moving mechanism 4 holds transfer head 5 movably horizontally in the Y-direction above part supply unit 1 and stage 2. Moving mechanism 4 has encoder 4A for detecting a position, and generates a pulse signal indicating the position of transfer head 5. The pulse signal is transmitted to mechanism controller 7 and recognition device 91 of control device 90. Transfer head 5 is a multiple-string-type head having six pickup heads 5A (see FIG. 12, FIG. 9 shows only three pickup heads). Respective pickup heads 5A, under control by mechanism controller 7, extract different electronic parts 6A, 6B, 6C, 6D, 6E, 6F from part supply unit 1, transfer them onto stage 2, and mount them to board 3.

Camera 8 is disposed in a moving route of transfer head 5 between part supply unit 1 and stage 2. Camera 8, as described below, includes a line sensor in which a plurality of pixels having a photoelectric transfer element are arranged in series in the X-direction. The electronic parts held by transfer head 5 are disposed above camera 8, and lighted from downside by lighting unit 77 (FIG. 12). Optical images of these electronic parts to be picked up are formed on the photoelectric transfer elements, and converted to electric image signals, which are supplied to recognition device 91 all the time.

Camera 8 picks up images of the electronic parts while moving mechanism 4 moves transfer head 5 in the Y-direction above camera 8, and thus scan images of the electronic parts to be recognized can be obtained. Moving mechanism 4 moves the line sensor of camera 8 in the Y-direction crossing the arrangement direction (X-direction) of the line sensor. In other words, moving mechanism 4 is a relatively moving mechanism for moving the line sensor relatively to the pickup objects.

Referring now to FIG. 10, FIG. 11, configurations of camera 8, and recognition device 91 for processing image signals supplied from camera 8 to recognize electronic parts are illustrated. In FIG. 10, camera 8 comprises line sensor 8A, output controller 26, and image correction unit 92.

Line sensor 8A includes a plurality of pixels 19 arranged in the X-direction. FIG. 11 shows one of the pixels. Pixel 19 comprises photoelectric transfer elements 22A in photoelectric transfer unit, gate elements 23A, 21A of first and second shift gates, and condensed elements 24A of sample hold unit. Each condensed element 24A is coupled to pixel selector 25A.

When an optical image is formed on line sensor 8A, transfer element 22A is exposed to light and accumulates charge. When output controller 26 transmits a control signal to the second shift gate, charges of transfer elements 22A are transmitted to condensed elements 24A in the sample hold unit through gate element 21A. The transmitted charges are held as voltage values corresponding to charge amounts. When the control signal is transmitted to the sample hold unit before transmission of new charges, the held voltage values are reset. When a control signal is transmitted to the first shift gate, the charges of transfer elements 22A are discharged to reset drain 20 through gate element 23A. The voltage of each transfer element 22A is thus initialized.

Pixel selector 25 selects one of a plurality of pixels 19 in line sensor 8A and outputs image signals from selected pixel 19. In other words, pixel selector 25 supplies image signal Vout (voltage output) from pixel 19 specified based on image pickup area information of image pickup area storage 10 described below, among condensed elements 24A in the sample hold unit. Output controller 26 controls this pixel selecting operation.

The image signals supplied from pixel selector 25 are fed to image correction unit 92, and corrected in black level and sensitivity. The corrected image data is A/D converted and fed to recognition device 91.

As shown in FIG. 10, recognition device 91 comprises coordinate output unit 23, area storage 10, writing controller 94, image storage 15, address setting unit 95, address controller 96, operation processor 97, and image processor 16. The image signals supplied from line sensor 8A of camera 8 are stored on image storage 15 through correction unit 92. Writing controller 94, address setting unit 95, and address controller 96 correspond to storage controller 12 in accordance with the first embodiment.

Coordinate output unit 23 outputs positional information to output controller 26 of camera 8, image storage 15, and writing controller 94, based on a pulse signal supplied from encoder 4A of moving mechanism 4. The positional information shows Y-directional relative position of transfer head 5 to line sensor 8A. The positional information supplied to output controller 26 is used as a timing of exchanging setting of a selected range when pixels for outputting the image signals are specified. Positional information supplied to image storage 15 is written into the image storage together with corresponding image signals. A relative positional relation between transfer head 5 and line sensor 8A when the image signals are extracted can be accurately obtained. Positional information supplied to writing controller 94 is used as an output timing of a control signal of controlling the pros and cons of writing the image signals to image storage 15.

Area storage 10 stores image pickup area information, namely information on an area set as an image extracting area in an image pickup view field. The image pickup area information comprises X-directional numerical values and Y-directional numerical values representing a size and a position of an image pickup area. The area information is stored on area storage 10 by processing data fed from operation unit 13 with operation processor 97. The area information is stored on area storage 10 also by reading data previously set as the image pickup area information in a predetermined data format from an external device.

Writing controller 94 outputs a control signal for controlling pros and cons of writing the image signals to image storage 15, based on Y-directional numerical values of the image pickup area information stored on area storage 10 and the Y-directional positional information supplied from coordinate output unit 23.

The write permission signal indicates timing of permitting the writing of the image signals supplied from camera 8 all the time onto an image memory. The write permission signal is supplied to image storage 15 to control the writing timing of the image signals. In other words, only image signals supplied from camera 8 with a predetermined timing are written into the memory of image storage 15, and the writing of image signals supplied with the other timing is prohibited.

The writing controller monitors positional information on a relative position between transfer head 5 and the line sensor that is transmitted from coordinate output unit 23, compares the information with the Y-directional data of the image pickup area stored on pickup area storage 10, and detects an image pickup start position. While transfer head 5 moves each electronic part to be picked up in the Y-direction, only the following image signals of image signals supplied from camera 8 are written into image storage 15. In other word, the written image signals are only the image signals output with a timing when a relative position of camera 8 to the image pickup object corresponds to a predetermined image pickup area set for each electronic part.

Address setting unit 95 sets a storage region for each image pickup area in image storage 15 based on the image pickup area information. In other words, address setting unit 95 sets the storage region into which image signals extracted from the image pickup areas set in the image pickup view field are written as one set of data for each image pickup area. Address setting unit 95 derives number of data of an image with a size same as the image pickup area based on numerical values (these can specify a size of the image pickup area) stored on area storage 10. A storage capacity of a storage region to be set is thus determined. A head address and an end address for determining a storage region for this storage capacity are output as address setting information. At this time, the number of data may be output instead of the end address.

Address controller 96 commands the storage addresses set for image storage 15 by address setting unit 95 and stores the image signals on a predetermined storage region. Address controller 96 generates an address signal to image storage 15 responsive to the control signal from writing controller 94 and controls the writing of the image signals into the storage region specified based on the address setting information. A series of image signals as one set of data are written sequentially from the storage region at the head address specified by the address setting information.

In other words, when the image signals from camera 8 are written into image storage 15, the write permission signal from writing controller 94 specifies a writing timing, and the address control by address controller 96 specifies addresses of a storage region for receiving the image signals. An output timing of the image signals from camera 8 synchronizes with the write permission signal from writing controller 94 and the address signal from address controller 96. The image signals are written into a predetermined storage region of image storage 15 responsive to a preset storage address.

Image processor 16 reads the written image signals, processes the image data, and recognizes electronic parts 6A–6F. The recognition result is fed to mechanism controller 7, and used for controlling a mounting operation of the electronic parts to board 3. The recognition result is supplied to a display unit 17 as required and displayed with a predetermined manner. Operation unit 13 performs various operations of recognition device 91 and an operation required for data input with operation processor 97.

Next, a setting process of an image pickup area is described. Line sensor 8A of camera 8 in accordance with the present embodiment is different from the conventional CCD line sensor. Line sensor 8A can supply image signals from any specified pixels, among a plurality of pixels 19 in line sensor 8A. In the image pickup by line sensor 8A, therefore, pixels for outputting image signals must be specified responsive to an image pickup object.

Line sensor 8A outputs image signals all the time. Only image signals supplied with a timing corresponding to the set image pickup area, among the image signals output all the time during scanning, are written into an image memory, and thus scan images of the image pickup object can be obtained. Accordingly, in the setting process of the image pickup area, pixels for outputting image signals in line sensor 8A are specified, and data for setting timing of writing the image signals is input.

Referring now to FIG. 12 and FIG. 13, the setting process is illustrated. FIG. 12 shows an example that six electronic parts 6A–6F to be recognized are held by transfer head 5 and picked up by camera 8 in a same image pickup operation. Transfer head 5 is moved above camera 8 in the Y-direction while an optical image is formed on line sensor 8A with an optical system of camera 8, and a scan image of each electronic part is obtained.

For setting image pickup areas, images of electronic parts 6A–6F held by respective nozzles of transfer head 5 are extracted, and then displayed on a monitor screen of display unit 17. The images of electronic parts 6A–6F respectively held by six nozzles of transfer head 5 are displayed at an interval corresponding to a nozzle pitch as shown in FIG. 13. At this time, an image pickup area for each electronic part is set.

Image information other than a region including the electronic parts to be recognized is not required for recognizing the electronic parts. Rectangular regions A–F parallel with a coordinate axis including the respective electronic parts 6A–6F are set as image pickup areas. In this setting operation, operation unit 13 specifies and inputs region frames with a pointer or the like on the display screen of display unit 17.

Operation processor 97 reads coordinate values on the display screen of the specified and fed image pickup areas A–F, and area storage 10 stores them as image pickup area information. The image pickup area information for specifying the image pickup areas comprises two X-directional numerical values and two Y-directional numerical values for each image pickup area. Numerical values (X1, X2, Y1, Y2), (X5, X6, Y5, Y6), (X9, X10, Y9, Y10), (X3, X4, Y3, Y4), (X7, X8, Y7, Y8), (X11, X12, Y11, Y12) are stored for respective image pickup areas A–F. These numerical values represent positional coordinates of corners of respective image pickup areas. These values specify X-directional and Y-directional sizes of respective image pickup areas, and X-directional and Y-directional positions thereof on the image coordinate system of display unit 17 on which the input is performed.

Image signals are supplied only from pixels 19 (belong to width directional range X(i)–X(i+1)) specified by the X-directional numerical values as shown in FIG. 13(B), among a plurality of pixels 19 arranged in the X-direction in line sensor 8A. In other words, pixel selector 25, under control by output controller 26, selects the pixels using these X-directional numerical values.

During a scan in the X-direction, a(i) pixels 19 output image signals. Here, a(i) is number of pixels and corresponds to image pickup area width W(i) (X(i+1)–X(i)). The output of image signals is repeated by number of scans (number of scan data, b(i)) corresponding to image pickup area length L(i)(Y(i+1)–Y(i)). Therefore, N(i) image signals are supplied from one image pickup area. Here, N(i) is number of signals and is a(i)×b(i)×n (n is integer), and i is integer (1, 3, 5, 7, 9, 11) corresponding to each image pickup area.

Referring now to FIG. 14, storage addresses are illustrated. The storage addresses relate the image pickup area information to a storage region in a memory of image storage 15 for receiving the image signals. Setting of the storage addresses specifies the storage region in image storage 15 for receiving the image signals read from the image pickup areas. The storage addresses specify a head address for data of the head pixel in each image pickup area and number N(i) of image signals in each image pickup area.

In FIG. 14, storage region 50 of image storage 15 includes storage regions 51A–51F for receiving the image pickup data for each of image pickup areas A–F. A head pixel and an end pixel for each image pickup area shown in FIG. 13(B) are respectively written into head addresses (AD1, AD3, AD5, AD7, AD9, AD11) and end addresses (AD2, AD4, AD6, AD8, AD10, AD12) in each storage region. Each storage region has a size in which N(i) image signals can be written, and a predetermined blank region is set between the end address of one storage region and the head address of its next region.

When image pickup area A set for electronic part 6A is picked up, for example, the head pixel is written into address AD1 in storage region 50, and N(1) image signals for image pickup area A are sequentially written into storage region 51A. The storage addresses are specified by the head address and number of data N(i) for each image pickup area, namely based on the X-directional and Y-directional numerical values stored in area storage 10.

Next, an operation for picking up the set image pickup area and an operation for writing the output image signals in accordance with the set storage addresses are described. Numerical values Y1–Y12 shown in FIG. 13 correspond to numerical values (for example, number of pulses supplied from encoder 4A) on the mechanical coordinate of moving mechanism 4 for moving transfer head 5.

Each Y-directional numerical value on the Y-axis in FIG. 13(A) represents a specific relative positional relation in the Y-direction between line sensor 8A and transfer head 5. These numerical values can show positional relations between line sensor 8A and horizontally moving transfer head 5. When positional information (pulse signal) from encoder 4A of moving mechanism 4 matches to numerical value Y1, for example, electronic part 6A held by transfer head 5 reaches the pickup start position of image pickup area A set for the part.

Positional information from encoder 4A is monitored. When the positional information matches to each of the Y-directional numerical values, specific relative positional relation corresponding to the value is realized. Based on the monitoring result, various operation controls such as operation control of transfer head 5, writing control of image signals, and update of set pixels for outputting the image signals in line sensor 8A are performed.

Data in image pickup areas A–F, namely numerical values shown in FIG. 13, is read from area storage 10 before an image pickup operation. When image pickup area D to be first picked up is extracted based on the read numerical values, output controller 26 sets pixels for outputting image signals. Pixels between X3 and X4 shown in FIG. 13, among pixels in line sensor 8A of camera 8, are set to output the image signals.

The set pixels supplies image signals all the time. The reading operation is started, and transfer head 5 holding electronic part A as an image pickup objects starts moving. A pulse supplied from encoder 4A in moving mechanism 4 is fed as positional information to writing controller 94 and output controller 26 of camera 8 through coordinate output unit 23. Writing controller 94 monitors this positional information.

When the positional information matches to Y3 corresponding to the pickup start position of image pickup area D, writing controller 94 outputs a write permission signal to image storage 15. At this time, address controller 96 sends an address signal to image storage 15. Image signals supplied from pixels for image pickup area D are written into storage region 51D in image storage 15.

Transfer head 5 then moves. When the positional information matches to Y1 corresponding to the pickup start position of image pickup area A, image signals are supplied from pixels not only between X3 and X4 but also between X1 and X2. While the positional information lies between Y1 and Y2, image signals are supplied from pixels between X1 and X2 and between X3 and X4. The image signals supplied from pixels between X1 and X2 are written into storage region 51A and the image signals from pixels between X3 and X4 are written into storage region 51D under write timing control and address control.

In an operation for continuously writing the image signals from image pickup areas A, D set in the width direction of pixel arrangement, a write permission signal from writing controller 94 specifies a writing timing. An address signal from address controller 96 specifies an address of a storage region for receiving the signals for each image pickup area. The writing operation is dynamically controlled responsive to the timing signal and the address signal.

In other words, the image signals supplied in time sequence are not always written in the storage address order of in the storage region. The image signals are written in discrete storage region 51A, 51D responsive to a corresponding relation based on preset storage addresses. During the output of image signal, the preset storage region has spotted regions that receive no image signal.

When transfer head 5 moves and reaches Y2 corresponding to the pickup completion position of image pickup area A, image signals are supplied only from pixels between X3 and X4 again. The image signals are subsequently written into storage region 51D. When transfer head 5 reaches Y4 corresponding to the pickup completion position of image pickup area D, writing controller 94 stops the output of the write permission signal to image storage 15, and prohibits the writing. The image storing on image pickup areas A, D finishes now. Image extraction and image signal writing for subsequent image pickup areas B, E, C, F are similarly performed. Image signals are thus written into all preset storage regions 51A–51F in storage region 50.

In the method described above, image signals supplied from a line sensor are written into a storage region specified by a storage address preset based on image pickup area information. Even when a plurality of image pickup areas are set in an image pickup width of one line sensor, the image signals can be written into a predetermined storage region every image pickup area.

A blank region can be thus minimized and storage capacity can be used effectively.

In the image pickup method in accordance with the present embodiment, an image pickup object is read while line sensor 8A in which a plurality of pixels are arranged in series in the X-direction is moved relatively to the image pickup object, in the Y-direction. This image pickup method comprises the following steps of:

(1) setting an image pickup area;
(2) setting pixels for outputting image signals, among pixels in line sensor 8A, based on X-directional width of the set image pickup area;
(3) outputting a control signal for controlling writing of image signals into image storage 15 based on Y-directional width of the set image pickup area, and setting a storage address of image storage 15 based on image pickup area information;
(4) outputting the image signals from pixels selected periodically one by one for image pickup; and
(5) monitoring a relative positional relation in the Y-direction between the image pickup object and the line sensor, and writing the image signals into a storage region specified by the storage address responsive to the control signal.

At this time, the image signals are supplied only from pixels set in step (2).

In this image pickup method, when line sensor 8A outputs the image signals, the image signals are selectively supplied only from an image pickup range corresponding to an image pickup area set as the image pickup object. This image pickup method can therefore remove useless time of outputting image signals from an unnecessary range and reduce an image reading time. Additionally, a blank region is minimized and storage capacity can be used effectively, since the output image signal is written and stored responsive to the preset storage address based on information related to the image pickup area.

Transfer head 5 moves onto stage 2 after electronic parts 6A–6F are recognized by extracting images from all image pickup areas A–D. When transfer head 5 moves onto stage 2 and each electronic part is mounted onto board 3, a displacement of each electronic part detected based on the recognition result is corrected. Since the mounting operation drastically reduces the image reading time, high speed image recognition can be realized, and mounting efficiency can be improved.

What is claimed is:

1. An image reading device comprising:
    a line sensor comprising a plurality of photoelectric transfer elements arranged in the X-direction;
    a pixel selector for selecting and outputting one of a plurality of pixels detected by said plurality of photoelectric transfer elements;
    a moving mechanism for relatively moving said line sensor and an image pickup object in the Y-direction crossing the X-direction;
    an image pickup area storage for storing X-directional data and Y-directional data for size of an image pickup area;
    an image storage for storing pixel data supplied from said pixel selector;
    an output controller for controlling pixel selection by said pixel selector based on the X-directional data; and
    a storage controller for controlling writing of an image signal into said image storage based on the Y-directional data and positional data in said moving mechanism.

2. The image reading device according to claim 1 wherein X-directional size of the image pickup area is set smaller than X-directional image pickup size of said line sensor.

3. The image reading device according to claim 1 wherein the Y-directional data includes at least Y-directional size data of the image pickup area.

4. The image reading device according to claim 1 wherein said storage controller comprises:
- a coordinate converting unit for converting the Y-directional data to data on a coordinate system of said moving mechanism; and
- a writing controller for controlling the pros and cons of writing pixel data into said image storage, based on the Y-directional data converted by the coordinate converting unit and the positional data.

5. The image reading device according to claim 1 wherein the Y-directional data belongs to the coordinate system of said moving mechanism.

6. The image reading device according to claim 1 wherein the Y-directional data includes at least positional information of the image pickup area on the coordinate system of said moving mechanism.

7. The image reading device according to claim 1 wherein the X-directional data includes at least X-directional size data of the image pickup area.

8. The image reading device according to claim 1 wherein said image output controller comprises:
- an object pixel setting unit for setting a pixel as a selection object, among the plurality of pixels, based on the X-directional data; and
- a selection controller for controlling said pixel selector to periodically select the pixel as the selection object.

9. The image reading device according to claim 1 wherein the X-directional data includes at least number of pixels corresponding to X-directional size of the image pickup area.

10. The image reading device according to claim 1 wherein said storage controller comprises:
- a writing controller for controlling the pros and cons of writing pixel data into said image storage, based on the Y-directional data and positional information of said relatively moving mechanism;
- an address setting unit for setting a storage address of said image storage based on the X-directional data and Y-directional data; and
- an address controller for controlling a writing address of said image storage based on the storage address.

11. An image reading method for moving a line sensor and an image pickup object relatively in the Y-direction crossing the X-direction, the line sensor comprising a plurality of photoelectric transfer elements arranged in the X-direction, said image reading method comprising the steps of:
- (a) setting an image pickup area;
- (b) setting a plurality of output pixels in the X-direction based on X-directional size of the set image pickup area;
- (c) selecting the plurality of output pixels periodically one by one and outputting an image signal; and
- (d) controlling writing of the image signal into an image storage based on a relative Y-directional position between the image pickup object and the line sensor.

12. A recording medium of a computer program for executing an image reading method for moving a line sensor and an image pickup object relatively in the Y-direction crossing the X-direction, the line sensor comprising a plurality of photoelectric transfer elements arranged in the X-direction, said recording medium comprising the programs of:
- (a) setting an image pickup area;
- (b) setting a plurality of output pixels in the X-direction based on X-directional size of the set image pickup area;
- (c) selecting the plurality of output pixels periodically one by one and outputting an image signal; and
- (d) controlling writing of the image signal into an image storage based on a relative Y-directional position between the image pickup object and the line sensor.

* * * * *